Patented Dec. 22, 1953

2,663,658

UNITED STATES PATENT OFFICE 2,663,658

ORNAMENTAL CRYSTALLINE GLAZE

Harry G. Schurecht, Detroit, Mich., assignor to Champion Spark Plug Company, Toledo, Ohio, a corporation of Delaware No Drawing. Application July 5, 1951,
Serial No. 235,380

19 Claims. (Cl. 117—70)

This invention relates to an ornamental glaze containing crystals large enough to be visible to the naked eye.

More particularly the invention relates to the production of an ornamental glaze containing visible crystals of oxides of one or more of certain high melting oxides from the third, fourth and fifth groups of the periodic system.

An object of the invention is to produce a decorative glaze containing ornamental crystals of one or more of the oxides of the elements indicated in the preceding paragraph, and one that can be applied to various surfaces.

Another object of the invention is to produce an ornamental glaze that can be fired at a low enough temperature for application upon glass, glazed pottery and enameled metal as well as upon a bisque body.

Another object of the invention is to produce an ornamental glaze which may be widely varied in appearance by changes in color, by changes in background and by varying relations to lighting and to other coatings, and with each of the effects reliably reproducible.

Other objects of the invention will appear as the description proceeds.

It is customary to prepare glazes containing silica as a material constituent. It has been believed a glaze should contain chiefly the elements of comparatively light atomic weight in order to have ornamental crystals therein. I have found that an ornamental crystalline glaze can be formed by supersaturating with an oxide of any one or more of the following elements: V, Ge, W, Ti, Zr, Ce, Cr, Se, Al, Te, and Cb, a magma composed of substantially any of the customary glass-forming ingredients excepting silica. Silica seems to have an inhibiting effect on the formation of crystals from the oxides of the group of elements above designated. PbO is a well known glass ingredient very suitable for forming the magma. Many of the oxides of the group named can be formed into an ornamental crystalline glaze alone, but the addition of other oxides is usually desirable to lower the melting point and so facilitate the manufacture and use of the glaze. The ornamental crystals, being formed from compounds comprising the oxide of the element in question, will be referred to as crystals of the respective oxides although other compounds of the element may be sometimes included in the crystals.

According to the invention an ornamental ceramic glaze containing crystals visible to the naked eye is provided. The glaze consists essentially of a transparent or translucent magma which is similar in appearance and composition to glazes that have long been articles of commerce; dispersed in this magma are crystals visible to the naked eye which lend to the glaze a startling ornamental effect. The magma, in general, consists of any glaze-forming oxide or mixture of glaze-forming oxides except silica; the most useful glaze-forming oxides include PbO, $Na_2O$, $K_2O$, MgO, CaO, BaO, $B_2O_3$, ZnO, SrO, and $Bi_2O_3$, the first named being the most advantageous. The crystals dispersed in the magma, in general, consist essentially of one or more of the high melting oxides of the following metals: V, Ge, W, Ti, Zr, Al, Ce, Cr, Se, Te, and Cb, the first three being preferred, and in the order named. The term "high melting" oxides is used herein and in the appended claims in its usual sense, namely to exclude fluxing oxides, but to include oxides that melt above about 700° C. A glaze of the invention is fused to the surface of a ceramic body having a melting point higher than that of the glaze; the ceramic body can be a glass body, a pottery body, an enamel, usually a fused ceramic enamel, on a metal, glass or pottery surface, or the like. When the ceramic body is a translucent or transparent glass body particularly startling effects can be achieved by applying a glaze of the invention to a surface thereof opposite a surface to which a metallic luster has previously been applied by known techniques.

In general, the method for producing glazes of the invention, which is illustrated in detail hereinafter, is a four step process. The first step comprises the preparation of a glaze slip by milling or mixing with water at least one glaze-forming oxide selected from the group set forth in the preceding paragraph, and at least one high melting oxide selected from the group set forth therein. The weight ratio of high melting oxide or oxides used to glass-forming oxides exceeds 1:1, preferably exceeds 6:4, and most desirably is at least 7:3. Although it has been found that glazes of the invention can be produced if only the high melting oxide is used to produce the slip, it is usually preferred that some glass-forming oxide be employed, and that the ratio of the refractory oxide thereto not exceed 19:1; most desirably that it not exceed 10:1. Next, the glaze slip is applied to the surface of a ceramic body having a melting point higher than that of the oxides in the slip, and the ceramic body coated with the glaze slip is then heated to a temperature sufficient to fuse the oxides in the latter but insufficient to fuse a substantial portion of the ceramic body. The slip can be readily brushed, dipped or sprayed onto the ceramic body. The exact temperature to which the coated ceramic body is heated depends upon the composition of the body and of the glaze. However, it is usually between 1300 and 2500° F., and must exceed the melting temperature of the particular glaze employed. This temperature is known to the art, and available in the literature, for many glaze compositions within the scope of the invention. If not known to a given worker in a particular instance it can be readily ascertained before making a glaze therewith merely by observing the temperature at which melting occurs. Finally, the ceramic body coated with the fused glaze is cooled to supersaturate the glaze and any fused portion of the ceramic body with the high melting oxides, and to crystallize the latter. Cooling according to the last step of the process can be readily accomplished merely by removing the body from the furnace, muffle, or the like, used to fuse the glaze.

Special effects can be achieved according to the process of the invention by an initial fusion of the glaze components carried out at a temperature insufficient to achieve good adhesion between the glaze and the surface of the ceramic body, cooling, etching away a portion of the glaze magma with a suitable acid, for example, hydrofluoric, and reheating the glazed ceramic body to a temperature sufficient to fuse the glaze and achieve good adhesion between it and the body, and finally cooling the ceramic body and the fused glaze as described in the preceding paragraph.

While an ornamental crystalline glaze can be made with any oxide of the group designated, each has some peculiarities, as well as the features they have in common. Vanadium oxide is preferred when all things are taken into consideration. The comparatively low temperature at which a vanadium crystal glaze can be formed is one of its attractive features.

Details of the practice of the invention in connection with vanadium oxide will be given first, and thereafter certain details relating to the other oxides.

A glaze may be produced from vanadium oxide alone or by mixing with vanadium oxide any magma-forming mixture which can be fired to form a glaze with the vanadium oxide crystallized therein. When the proportion of vanadium oxide to magma is proper, usually 70% to 90% vanadium oxide, the vanadium oxide forms crystals large enough to be visible to the naked eye and embedded in the magma. Substantially any material may be used in the magma that is customarily employed for forming glass, glaze or enamel, provided it is used in such quantity or proportion and combination that it matures at the proper temperature. For ornamental purposes, the vanadium crystals must be at least partially visible, and for that purpose the magma must have a certain degree of transparency, but it may also have a color of its own and thereby modify the appearance of the vanadium oxide crystals. The glaze may be applied to glassware, pottery or metal.

A typical glaze may be formed from 0 to 30% of PbO and 100 to 70% $V_2O_3$. 2% gum arabic or a similar binder may be added. The mixture may be milled before applying to the ware, but good results have also been obtained by merely blunging or stirring with water to form a glaze slip having the consistency of thick cream. When fired to temperatures from 1200° F. to 1500° F. the glaze melts, and upon cooling develops colored fern and needle-like crystals. When 100% $V_2O_3$ is used, it melts and then crystallizes to a varying extent depending upon the surface to which applied, the temperature of firing, rate of cooling, etc.

Various other oxides and other compositions yielding oxides when fired have been used to form a magma instead of PbO, as described in the preceding paragraph. For example, entirely satisfactory glazes containing crystals visible to the naked eye can be produced using as the glass forming component $Na_2O$, $Na_2CO_3$, $K_2O$, $K_2CO_3$, MgO, $Mg(OH)_2$, CaO, $CaCO_3$, BaO, $BaCO_3$, $B_2O_3$ and $H_3BO_3$. Similarly, any other glaze- or glass-forming compound, except silica, can be used provided the entire magma will melt with the $V_2O_3$ and, when cooled, be supersaturated therewith.

The firing should be to a temperature which will cause the glaze to adhere to the surface to which it is applied, but not high enough to cause the vanadium oxide to be dissolved in the supporting surface.

For example, if a glaze of 5% PbO and 95% $V_2O_3$ is applied to ordinary glass and fired to 1250° F., it is not satisfactorily adherent to the glass. When fired to 1350° F. it is firmly adherent, but when fired still higher, the $V_2O_3$ goes into solution in the glass and fails to produce the desired crystalline effect. The proper temperature is affected by the kind of glass to which the glaze is applied. For example, the same glaze that matures at 1350° F. on fairly refractory glass may mature at 1250° F. on a low melting point glass.

An increase in the oxide used with the $V_2O_3$ increasing the magma in which the crystals are embedded increases the durability of the glaze. For this purpose, PbO may be increased up to 30%, but if 40% PbO is used the $V_2O_3$ no longer crystallizes out satisfactorily. The amount of other oxide which can be used with the $V_2O_3$ varies with the kind of oxide as well as with the material to which the glaze is applied and the temperature used.

When applied to glass, brown, tan, black and green needle-like crystals are formed, and the colors may be modified by the magma-forming oxides. By applying the glaze to colored glass, the background is colored and a variety of colors producing many different effects in both transmitted and reflected light are produced. Also, lusters may be applied to the other side of glass from the glaze, thus enhancing the beauty of the crystals. For example, mother of pearl luster may be applied to the interior of the glass with the glaze on the outside, or platinum or gold luster may be used to give a metallic background. Methods for producing mother of pearl luster, gold luster, and other lusters, are well known to the art. Moreover, the glaze may be applied to the interior of a vase or other container. In this case, the observer views the contact between the glaze and the glass and sees a pattern of golden and colored crystals which is very attractive and very different in appearance from the glaze applied to the outside of the container. The glaze could be used on both sides of the glass, and the combined effect thus be obtained. Thus it will be seen many different ornamental effects may be achieved with the glaze on ornamental glassware such as ornamental windows, lighting fixtures, reflectors, vases or other containers, etc.

The glaze may be used on pottery as well as on glass, although the effect of transmitted light is lost with the pottery. The glaze is fired at a low enough temperature so that it can be applied over previously glazed ware. If the first glaze is low melting, the vanadium oxide glaze will sufficiently adhere at a lower temperature than where applied to relatively refractory glass.

The glaze may be applied directly to the bisque ware. In this case, the nature of the ware and its effect on the glaze must be considered. If the magma is absorbed by the bisque ware, a matte effect may result, but when properly applied, a bright glaze may be formed on bisque bodies with the typical ornamental effects of the crystals.

Metal can be provided with a glaze containing crystals visible to the naked eye, according to the invention, if a suitable enamel ground coat or complete enamel coat is first applied to the metal. The glaze of the invention is then applied to the enamel coat the same as to glassware or pottery as described above. Usually the enamel coat will be lower melting than ordinary glass, and accordingly lower temperatures are used in glazing. The metal may be iron, copper, silver, gold or other metal to which a suitable enamel coat can be applied. Although the glaze may affect the color of the under coat on either pottery or metal, the original color of the under coat, or of the surface to which a transparent under coat was applied, governs largely the background color for the glaze. Sometimes the magma interferes with the desirable distinct view of the crystal formation. In such a case, the glaze is fired at a lower than normal temperature and after cooling and crystallization, the magma is etched away by acids to the desired extent, leaving the larger crystals intact. The glaze is then refired to produce good adherence, and the final glaze presents the crystals with the desired limited amount of colored background.

As indicated above, the oxides added to the $V_2O_3$ may be varied to modify the tint or color. In many instances this affects the color not only of the magma, but also of the crystals.

In general, when oxides of elements in group I of the periodic table are employed as magma forming components, the glazes produced have an olive green color; the oxides of the elements of groups II and III with low molecular weights when so used produce transparent, light amber glazes; whereas oxides of these groups having high molecular weights produce glazes with varying shades of brown.

Oxides of elements of groups IV and V of the periodic table with low molecular weights when used as high melting oxides produce glazes containing brown crystals, while those with high molecular weights produce jet black crystals.

Obviously mixtures of the oxides, as well as other chemical compounds besides oxides, may be used with the vanadium oxide in place of the individual oxides.

In most cases satisfactory adherence and durability can be obtained with the material added to the vanadium oxide and firing the same to the proper temperature, but in cases where this is not possible, a flux, like lead borate, lead oxide, bismuth oxide, or the like, may be added.

It will be seen that the described glaze may be applied to glass or to relatively low melting pottery glaze or enamel coats on metal, and produce the characteristic ornamental crystals of vanadium compounds large enough to be visible to the naked eye, and that many variations may be made in the composition and application of the glaze within the scope of the invention as defined in the following claims.

Germanium glaze

For general purposes, glazes containing crystals of $GeO_2$ are most desirable after those with vanadium oxide crystals. In general, the manufacture and use of the germanium glazes are similar to the foregoing discussion of vanadium glazes, except for the generally higher melting point of the germanium glaze.

When a mixture of 20% PbO and 80% $GeO_2$ is fired to 2300° F., a colorless transparent glaze is formed with white mat opaque crystals. If more lead oxide than 20% is used, the glaze becomes a glass with great brilliancy and without crystals. This is a silica-free glass and, so far as known, has never been reported in literature. Since it is silica-free, it might be used as an optical glass.

The size of the crystals in this case range from $\frac{1}{16}''$ to $\frac{3}{16}''$. The crystals often have a square cross-section and form more isolated crystals than those previously described.

Adding coloring oxides to these glazes greatly changes the color, texture, and amount of crystallization. For example, if chromium oxide is added, the PbO content can be increased considerably above 20% and still crystallization will occur.

When 2.5% iron oxide is used, a golden brown crystal develops in a greenish colored glass. The crystals are mat and opaque, while the glass is transparent. The crystals average $\frac{1}{16}''$ to $\frac{1}{8}''$ in diameter, being smaller than those which develop in the colorless glaze.

The addition of 2.5% uranium oxide produces a yellow glass with yellow brown mat crystals.

When 0.5% cobalt oxide is employed, a blue glaze with bright blue crystals is formed.

The addition of 2.5% copper oxide produces a green mat glaze studded with green crystals and having a bright finish.

It is apparent, therefore, that when certain coloring oxides, like uranium oxide, are added, the glaze becomes bright, while the crystal becomes mat, and other coloring oxides, like copper oxide, cause the glaze to become mat while the crystal becomes bright.

Tungsten glaze

Next in preference to germanium glazes are those containing tungsten.

When glazes composed of 48.5 to 65.8% PbO and 51.5 to 34.2% $WO_3$ are applied to a vitreous body and fired to 2300° F. a white mat crystalline glaze is produced. These glazes have a wax-like smooth feel.

When 0.5% cobalt oxide is added, blue, brown, and gray patches of crystals are formed which produce a pleasing effect.

When 2.5% iron oxide is added, blue, brown, and gray patches of crystals are formed which produce a pleasing effect.

When 2.5% iron oxide is added, dark red, brown, and tan patches of crystals are formed.

The addition of 2.5% manganese oxide produces black fan-shaped crystals.

Adding 2.5% copper oxide produces a mixture of fan-shaped and mottled crystals having a black color.

Adding 0.5% chromium oxide produces patches of brown, orange, and light green crystals.

Molybdenum glaze

A mixture of 90% $MoO_3$ and 10% $Pb(BO_2)_2$ when fired to 2000°–2200° F. produced light gray-green crystals with a brilliant sparkle.

A glaze composed of 80% $MoO_3$ and 20% $Pb(BO_2)_2$ produced a brown crystal at 1460° F. with a gray metallic background.

A glaze composed of 70% $MoO_3$ and 30% $Pb(BO_2)_2$ produced light brown fan-shaped crystals.

Zirconium glaze

Upon adding zirconium oxide to certain mixtures, crystalline glazes were produced at cone 31, 3056° F. (1680° C.). The crystals were long and needle-like and the glaze had an ivory mat texture. The compositions which produced the crystalline glaze were as follows:

21.03% BeO, 41.03% $Al_2O_3$, 59.30% brucite, 20.40% $ZrO_2$.

61.03% BeO, 21.03% $Al_2O_3$, 28.91% brucite, 20.40% $ZrO_3$ and 2.57% whiting.

The above compositions without the zirconium oxide additions were not crystalline, so it is apparent that the crystalline pattern was caused by the presence of zirconium oxide in the glaze.

Although lower maturing glazes were not tested, it is almost certain that crystalline glazes can be produced by using a high content of zirconium oxide in glazes which mature at low temperatures.

Cerium and tin glazes

When certain mixtures containing 20% $SnO_2$ and 45.9 to 76.5% $CeO_2$ were fired to cone 31, 3056° F. (1680° C.), crystalline glazes were produced. The compositions and appearance of these glazes are as follows:

76.5% $CeO_2$, 20% $SnO_2$, 1.5% whiting, 2.0% talc, 1.5% bentonite. A brown glaze with small crystals was produced. The crystals are about $\frac{1}{32}$″ in diameter, and are mat while the rest of the glaze is brown.

45.9% $CeO_2$, 30.6% BeO, 20% $SnO_2$, 1.5% whiting, 2% talc, and 1.5% bentonite. Very crystalline. Black and gray crystals tabular in form were produced. Most of the crystals extend out from the ware about $\frac{1}{32}$ to $\frac{1}{16}$″.

76.5% $CeO_2$, 20.0% $SnO_2$, 1.5% whiting, 2.0% talc, 1.5% bentonite, 1.5% brucite and 1.5% strontium carbonate. A brown crystalline glaze with needle shaped crystals was developed.

Titanium crystal glaze

A crystalline glaze was produced at cone 31, 3056° F. (1680° C.) with a mixture W-ii composed of 61.03% BeO, 21.03% $Al_2O_3$, 30.4% brucite, and 13.35% $TiO_2$. The crystals were needle shaped.

Titanium oxide, together with zinc oxide, has been used as crystallizers for crystalline silicate glazes, although as far as I know have never been used for this purpose in silica-free glazes.

The practice of the invention with vanadium oxide has been disclosed in considerable detail, less detail being given as to the use of other oxides, but it will be understood that in general the entire group of oxides noted above has similar characteristics for forming crystalline glazes. However, chromic oxide crystals are less inhibited than vanadium oxide crystals by silica, and the chromic crystals have been formed in silica glazes, which are not claimed herein. Otherwise, the formation of crystalline glazes with chromic oxide follows very much the same pattern as described above in connection with the other oxides, it being deemed unnecessary to give specific examples of all of the oxides in the field covered, since the manufacture of glazes with the other oxides in the field follows the pattern described for the analogous oxides described.

The present application is a continuation in part of my application Serial Number 771,400, filed August 29, 1947, entitled "Glaze With Ornamental Crystals", and now abandoned.

I claim:

1. A ceramic body carrying a silica-free ornamental ceramic glaze containing crystals visible to the naked eye, wherein the glaze is lower melting than the ceramic base, and consists essentially of at least one glaze-forming oxide of the group consisting of PbO, $Na_2O$, $K_2O$, MgO, CaO, BaO, $B_2O_3$, ZnO, SrO, and $Bi_2O_3$, and the crystals are composed of at least one high melting oxide of the group consisting of the oxides of Ti, Al, Ge, Zr, Sn, Se, Ce, Cr, Te, W, V, and Cb, and wherein the weight ratio of high melting oxides to glaze-forming oxides exceeds 1:1 but is not greater than 19:1.

2. A ceramic body carrying a silica-free ornamental ceramic glaze as claimed in claim 1 wherein the crystals are composed of an oxide of V.

3. A ceramic body carrying a silica-free ornamental ceramic glaze as claimed in claim 2 wherein the ceramic body is a glass body.

4. A ceramic body carrying a silica-free ornamental ceramic glaze as claimed in claim 3 wherein the glaze-forming oxide is PbO, and the ratio, by weight, of vanadium oxide thereto is greater than 6:4.

5. A pottery base carrying a silica-free ornamental ceramic glaze containing crystals visible to the naked eye, wherein the glaze is lower melting than said pottery base, and contains vanadium oxide crystals visible to the naked eye, and consists essentially of at least one glaze-forming oxide of the group consisting of PbO, $Na_2O$, $K_2O$, MgO, CaO, BaO, $B_2O_3$, ZnO, SrO, and $Bi_2O_3$, and wherein the weight ratio of the vanadium oxide to glaze-forming oxides exceeds 1:1 but is not greater than 19:1.

6. An enameled metal base carrying a silica-free ornamental ceramic glaze containing crystals visible to the naked eye, wherein the glaze is lower melting than said enamel, and contains vanadium oxide crystals visible to the naked eye, and consists essentially of at least one glaze-forming oxide of the group consisting of PbO, $Na_2O$, $K_2O$, MgO, CaO, BaO, $B_2O_3$, ZnO, SrO, and $Bi_2O_3$, and wherein the weight ratio of the vanadium oxide to glaze-forming oxides exceeds 1:1 but is not greater than 19:1.

7. A ceramic body carrying a silica-free ornamental ceramic glaze as claimed in claim 1 wherein the crystals are composed of an oxide of germanium.

8. A ceramic body carrying a silica-free ornamental ceramic glaze as claimed in claim 1 wherein the crystals are composed of an oxide of tungsten.

9. A method for producing a silica-free ornamental ceramic glaze on a ceramic base higher melting than said glaze which comprises (1) applying a glaze slip consisting essentially of water, at least one glaze-forming oxide of the group consisting of PbO, $Na_2O$, $K_2O$, MgO, CaO, BaO, ZnO, $B_2O_3$, SrO, and $Bi_2O_3$, and at least one high melting oxide of the group consisting of the oxides of Ti, Al, Ge, Zr, Sn, Ce, Cr, Se, Te, W, V, and Cb wherein the weight ratio of the latter oxides to the former exceeds 1:1 but is not greater than 19:1 to the surface of the ceramic body; (2) heating the ceramic body coated with the glaze slip to a temperature between about 1300° F. and about 2500° F. sufficient to fuse the oxides in the latter but insufficient to fuse a substantial portion of the ceramic body; and (3) cooling the ceramic body and the fused glaze to supersaturate the latter and any fused portion of the ceramic body with the high melting oxide and form visible crystals thereof.

10. A method for producing a silica-free ornamental ceramic glaze on a ceramic base higher melting than said glaze which comprises (1) applying a glaze slip consisting essentially of water, at least one glaze-forming oxide of the group consisting of PbO, Na₂O, K₂O, MgO, CaO, B₂O₃, ZnO, BaO, SrO, and Bi₂O₃, and an oxide of vanadium wherein the weight ratio of the oxide of vanadium to the glaze-forming oxides exceeds 1:1 but is not greater than 19:1 to the surface of the ceramic body; (2) heating the ceramic body coated with the glaze slip to a temperature between about 1300° F. and about 2500° F. sufficient to fuse the oxides in the latter but insufficient to fuse a substantial portion of the ceramic body; and (3) cooling the ceramic body and the fused glaze to supersaturate the latter and any fused portion of the surface of the ceramic body with the vanadium oxide and form visible crystals thereof.

11. A method as claimed in claim 9 in which the ceramic body is a glass body.

12. A method as claimed in claim 10 in which the ceramic body is a pottery body.

13. A method as claimed in claim 12 in which the pottery body is a glazed pottery body.

14. A method as claimed in claim 10 in which the ceramic body is an enamel ground coat provided on a metal surface.

15. A method for producing a silica-free ornamental ceramic glaze on a ceramic base higher melting than said glaze which comprises (1) applying a glaze slip that consists essentially of water, an oxide of vanadium, and lead oxide wherein the weight ratio of the oxide of vanadium to the lead oxide exceeds 1.5:1 but is not greater than 10:1 to the surface of the ceramic body; (2) heating the ceramic body coated with the glaze slip to a temperature between about 1300° F. and about 2500° F. sufficient to fuse the oxides in the latter but insufficient to fuse a substantial portion of the ceramic body; and (3) cooling the ceramic body and the fused glaze to supersaturate the latter and any fused portion of the surface of the ceramic body with the vanadium oxide and form visible crystals thereof.

16. A method for producing a silica-free ornamental ceramic glaze on a ceramic base higher melting than said glaze which comprises (1) applying a glaze slip consisting essentially of at least one glaze-forming oxide of a group consisting of PbO, Na₂O, K₂O, MgO, CaO, BaO, B₂O₃, ZnO, SrO and Bi₂O₃, and germanium oxide wherein the weight ratio of the germanium oxide to the glaze-forming oxides exceeds 1:1 but is not greater than 19:1 to the surface of the ceramic body; (2) heating the ceramic body coated with the glaze slip to a temperature between about 1300° F. and about 2500° F. sufficient to fuse the oxides in the latter but insufficient to fuse a substantial portion of the ceramic body; and (3) cooling the ceramic body and the fused glaze to supersaturate the latter and any fused portion of the surface of the ceramic body with the germanium oxide and form visible crystals thereof.

17. A method for producing a silica-free ornamental ceramic glaze on a ceramic base higher melting than said glaze which comprises (1) applying a glaze slip consisting essentially of water, at least one glaze-forming oxide of the group consisting of PbO, Na₂O, K₂O, MgO, CaO, BaO, B₂O₃, ZnO, SrO and Bi₂O₃, and tungsten oxide wherein the weight ratio of the tungsten oxide to the glaze-forming oxides exceeds 1:1 but is not greater than 19:1 to the surface of the ceramic body; (2) heating the ceramic body coated with the glaze slip to a temperature between about 1300° F. and about 250° F. sufficient to fuse the oxides in the latter but insufficient to fuse a substantial portion of the ceramic body; and (3) cooling the ceramic body and the fused glaze to supersaturate the latter and any fused portion of the surface of the ceramic body with the tungsten oxide and form visible crystals thereof.

18. A method for producing a silica-free ornamental ceramic glaze on a ceramic body higher melting than said glaze which comprises (1) applying a glaze slip consisting essentially of water, at least one glaze-forming oxide of the group consisting of PbO, Na₂O, K₂O, MgO, CaO, BaO, B₂O₃, ZnO, SrO, and Bi₂O₃, and an oxide of vanadium wherein the weight ratio of the oxide of vanadium to the glaze-forming oxides exceeds 1:1 but is not greater than 10:1 to the surface of the ceramic body; (2) heating the ceramic body coated with the glaze slip to a temperature sufficient to fuse the oxides in the latter, but insufficient to achieve good adhesion between the body and the glaze; (3) cooling the glazed body to about room temperature; (4) treating the body with an acid to remove a portion of the glaze; (5) heating the glazed ceramic body to a temperature between about 1300° F. and about 1500° F. sufficient to achieve good adhesion between it and the glaze; and (6) cooling the ceramic body and the fused glaze to supersaturate the latter and any fused portion of the surface of the ceramic body with the vanadium oxide and form visible crystals thereof.

19. A method for producing a silica-free ornamental ceramic glaze on a ceramic body higher melting than said glaze which comprises (1) applying a glaze slip that consists essentially of water, an oxide of vanadium and lead oxide, wherein the weight ratio of the oxide of vanadium to the lead oxide is at least 7:3 but is not greater than 10:1 to the surface of the ceramic body; (2) heating the ceramic body coated with the glaze slip to a temperature from about 1300° F. to about 1425° F. for a time sufficient to fuse the oxides in the latter but insufficient to fuse a substantial portion of the ceramic body; and (3) cooling the ceramic body and the fused glaze to supersaturate the latter and any fused portion of the surface of the ceramic body with the vanadium oxide and form visible crystals thereof.

HARRY G. SCHURECHT.

References Cited in the file of this patent

UNITED STATES PATENTS

| Number | Name | Date |
|---|---|---|
| 2,110,117 | Duldner et al. | Mar. 1, 1938 |
| 2,225,161 | Deyrup | Dec. 17, 1940 |
| 2,397,005 | Harbert et al. | Mar. 19, 1946 |
| 2,438,335 | Earl | Mar. 23, 1948 |
| 2,441,447 | Seabright | May 11, 1948 |